(12) United States Patent
Hatakeyama

(10) Patent No.: US 8,726,041 B2
(45) Date of Patent: May 13, 2014

(54) METHODS AND APPARATUS FOR GENERATING A RANDOM NUMBER IN ONE OR MORE ISOLATED PROCESSORS

(75) Inventor: Akiyuki Hatakeyama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1330 days.

(21) Appl. No.: 11/746,423

(22) Filed: May 9, 2007

(65) Prior Publication Data
US 2008/0279370 A1 Nov. 13, 2008

(51) Int. Cl.
*G06F 21/00* (2013.01)

(52) U.S. Cl.
USPC .............. 713/193; 726/15; 708/250

(58) Field of Classification Search
USPC ............................ 726/15; 713/193
See application file for complete search history.

(56) References Cited

U.S. PATENT DOCUMENTS

| | | | | |
|---|---|---|---|---|
| 5,615,263 | A * | 3/1997 | Takahashi | 713/164 |
| 6,314,440 | B1 * | 11/2001 | O'Toole et al. | 708/250 |
| 6,430,170 | B1 * | 8/2002 | Saints et al. | 370/335 |
| 6,438,666 | B2 * | 8/2002 | Cassagnol et al. | 711/163 |
| 6,523,067 | B2 * | 2/2003 | Mi et al. | 709/229 |
| 6,526,491 | B2 | 2/2003 | Suzuoki et al. | |
| 6,823,462 | B1 * | 11/2004 | Cheng et al. | 726/15 |
| 7,086,086 | B2 * | 8/2006 | Ellis | 726/15 |
| 7,131,001 | B1 * | 10/2006 | Johnson | 713/168 |
| 7,136,991 | B2 * | 11/2006 | Henry et al. | 712/228 |
| 7,401,358 | B1 * | 7/2008 | Christie et al. | 726/21 |
| 7,428,754 | B2 * | 9/2008 | Neumann et al. | 726/15 |
| 7,484,247 | B2 * | 1/2009 | Rozman et al. | 726/34 |
| 7,496,767 | B2 * | 2/2009 | Evans | 713/193 |
| 7,509,491 | B1 * | 3/2009 | Wainner et al. | 713/163 |
| 7,552,345 | B2 * | 6/2009 | Chang et al. | 713/193 |
| 8,607,070 | B2 * | 12/2013 | Chen et al. | 713/193 |
| 2002/0053031 | A1 * | 5/2002 | Bendinelli et al. | 713/201 |
| 2003/0101322 | A1 * | 5/2003 | Gardner | 711/163 |
| 2004/0068668 | A1 * | 4/2004 | Lor et al. | 713/201 |
| 2005/0071651 | A1 * | 3/2005 | Aguilar et al. | 713/189 |

OTHER PUBLICATIONS

Nargunam, A. Shajin; Sebastian, M.P. Distributed Security Scheme for Mobile Ad Hoc Networks. IEEE International Conference on Information Acquistion. Pub. Date: 2006. Relevant pp. 166-171. Found on the World Wide Web at: http://ieeexplore.ieee.org/stamp/stamp.jsp?tp=&arnumber=4097921.*
Sony, Cell Broadband Engine Architecture, http://cell.scei.co.jp/e_download.html (Aug. 8, 2005), see section 11.
Sony, Cell Broadband Engine Architecture, http://cell.scei.co.jp/e_download.html (Oct. 3, 2006), see section 11.

* cited by examiner

*Primary Examiner* — Cordelia Zecher
*Assistant Examiner* — Jeremiah Avery
(74) *Attorney, Agent, or Firm* — Matthew B. Dernier, Esq.; Gibson & Dernier LLP

(57) ABSTRACT

A system and method is disclosed which may include providing at least one processor with an integrally disposed random number generator (RNG) therein; entering a protected mode by said at least one processor; and generating a random number using said RNG in said at least one processor after entering said protected mode.

22 Claims, 10 Drawing Sheets

METHODS AND APPARATUS FOR GENERATING A RANDOM NUMBER IN ONE OR MORE ISOLATED PROCESSORS

BACKGROUND

The present invention relates to methods and apparatus for securely generating a random number in one or more processors.

FIG. 1 illustrates an existing multiprocessing system 10 in which a plurality of processors 12A-D are coupled over a bus 14 and provide for series or parallel operation to achieve a processing objective. The multiprocessing system 10 may employ a random number generator (RNG) 16 within the system 10 that is used by all of the processors 12 requiring random number generation. Among the uses of the random number generator is to assist in creating a virtual private network (VPN) between the multiprocessor system 10 and an external system.

The problem with this manner of random number generation is that the multiprocessor system cannot host more than one user during the existence of the VPN without jeopardizing security. Indeed, without limiting access to the entire system 10, at least while the RNG 16 generates the random number, the random number could be intercepted, and the VPN would be susceptible to hacking. This severely limits the applications in which the system 10 may be employed.

Moreover, the randomness of the random number generated by the system described above is less than ideal. Limitations inherent in the hardware employed in such random number generators may cause the RNG 16 to have a tendency to generate either a disproportionate number and/or position of 1's or a disproportionate number and/or position of 0's.

Generally, a hardware circuit is coupled to an oscillator such as a ring oscillator which compares the voltage output value from the oscillator to a threshold voltage ($V_{th}$) provided by the hardware circuit. When the oscillator output voltage exceeds the threshold voltage, a logic 1 bit is generally output. Conversely, when the oscillator output voltage is lower than the threshold voltage, a logic 0 bit is generally output.

If the oscillator output voltage was exactly centered on $V_{th}$, and the hardware circuit voltage used for comparison to the oscillator voltage never strayed from $V_{th}$, a truly random stream of output bits could generated. However, due to semiconductor manufacturing process variations, noise, operating frequency variations, operating voltage variations, among other factors, the voltage output of the oscillator is generally not ideal, and therefore may not be centered on $V_{th}$. Moreover, due to non-idealities in the values of various circuit components, the threshold voltage $V_{th}$ provided by the hardware circuit, used for comparison with the oscillator output voltage, may also depart from its ideal value. The consequence of such non-ideal behavior of both the oscillator and the hardware circuit may reduce the randomness of the ring oscillator 16 output.

FIG. 2 illustrates one example of non-ideal behavior of a ring oscillator. For the sake of simplicity, in this discussion, the graphs of the oscillator output 26A and 26B (collectively, 26) are assumed to be ideal. The ideal threshold voltage $V_{th}$ 22 for the hardware circuit is shown essentially equidistant from the upper and lower boundaries of the graph which represent $V_{dd}$ and $V_{ss}$, respectively. If this ideal $V_{th}$ 22 was used for comparison with the oscillator output, sampling of the oscillator output would generally lead to a random sequence of logical 1 bits and logical 0 bits in the ring oscillator output bit stream.

However, where the hardware circuit used for sampling the oscillator output 26 uses actual $V_{th}$ 24, it is clear that the oscillator output 26 voltage would be greater than $V_{th}$ 24 most of the time. Consequently, a sampling process that conducts a sequence of comparisons between oscillator output 26 and actual $V_{th}$ 24 will lead to a output bit stream that is biased in favor of logical 1 bits, thereby defeating the desire to obtain a random distribution of bit values in the ring oscillator output bit stream. In the above, the randomness-defeating effect of a non-ideal hardware circuit threshold voltage $V_{th}$ 24 was discussed. However, those of ordinary in skill in the art will recognize that non-ideal oscillator output voltage would also defeat the randomness of the output bit stream from ring oscillator 16.

Accordingly, there is a need in the art for a new approach to generating random numbers in a multiprocessing system which will enable: i) the generation of more randomized random numbers, ii) a system to simultaneously execute the programs of un-trusted entities, and/or iii) the creation of secure areas and communication links, the security of which will not be breached.

SUMMARY OF THE INVENTION

According to one aspect, the invention provides a method, which may include providing at least one processor with an integrally disposed random number generator (RNG) therein; entering a protected mode by the at least one processor; and generating a random number using the RNG in the at least one processor after entering the protected mode. Preferably, the protected mode is an isolated mode in which neither the at least one processor nor any device external to the at least one processor may initiate a transfer of information into or out of the at least one processor. Preferably, the protected mode is a secure mode in which the at least one processor may initiate a transfer of information into or out of the at least one processor, but no external device or devices may initiate a transfer of information into or out of the at least one processor. Preferably, the method further comprises executing a program on the at least one processor to increase a randomness of the random number. Preferably, the method further comprises storing the program in encrypted form in a read only memory (ROM) within the at least one processor.

Preferably, the program stored in the ROM is inaccessible by unauthorized entities. Preferably, the method further comprises loading the program after entering the protected mode; decrypting the program; and running the program. Preferably, the decrypting comprises: decrypting the program employing a private key stored in a ROM within the at least one processor. Preferably, the method further comprises verifying the authenticity of the program by executing a hash algorithm to produce a hash result; and comparing the hash result to a predetermined hash value. Preferably, the predetermined hash value is stored in a ROM within the at least one processor.

Preferably, the method further comprises implementing a virtual private network (VPN) between the at least one processor and at least one other device, implementing using the random number. Preferably, the at least one other device is a processor located in a same multiprocessor system as the at least one processor. Preferably, the at least one other device is external to a multiprocessor system in which the at least one processor is located. Preferably, the RNG comprises a ring oscillator.

According to one aspect, the invention provides an apparatus which may include at least one processor with an integrally disposed random number generator (RNG) therein, wherein the at least one processor is operable to: enter a protected mode by the at least one processor; and generate a random number using the RNG in the at least one processor after entering the protected mode. Preferably, the protected mode is an isolated mode in which neither the at least one processor nor any device external to the at least one processor may initiate a transfer of information into or out of the at least one processor. Preferably, the protected mode is a secure mode in which the at least one processor may initiate a transfer of information into or out of the at least one processor, but no external device or devices may initiate a transfer of information into or out of the at least one processor. Preferably, the apparatus is operable to: execute a program on the at least one processor to increase a randomness of the random number. Preferably, the apparatus is further operable to: store the program in encrypted form in a read only memory (ROM) within the at least one processor. Preferably the program stored in the ROM is inaccessible by unauthorized entities.

Preferably, the apparatus is further operable to: load the program after entering the protected mode; decrypt the program; and run the program. Preferably, the decrypting comprises: decrypting the program employing a private key stored in a ROM within the at least one processor. Preferably, the apparatus is further operable to: verify the authenticity of the program by executing a hash algorithm to produce a hash result; and compare the hash result to a predetermined hash value. Preferably, the predetermined hash value is stored in a ROM within the at least one processor. Preferably, the apparatus is operable to: implement a virtual private network (VPN) between the at least one processor and at least one other device, the step of implementing using the random number. Preferably, the at least one other device is a processor located in a same multiprocessor system as the at least one processor. Preferably, the at least one other device is external to a multiprocessor system in which the at least one processor is located. Preferably, the RNG comprises a ring oscillator.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
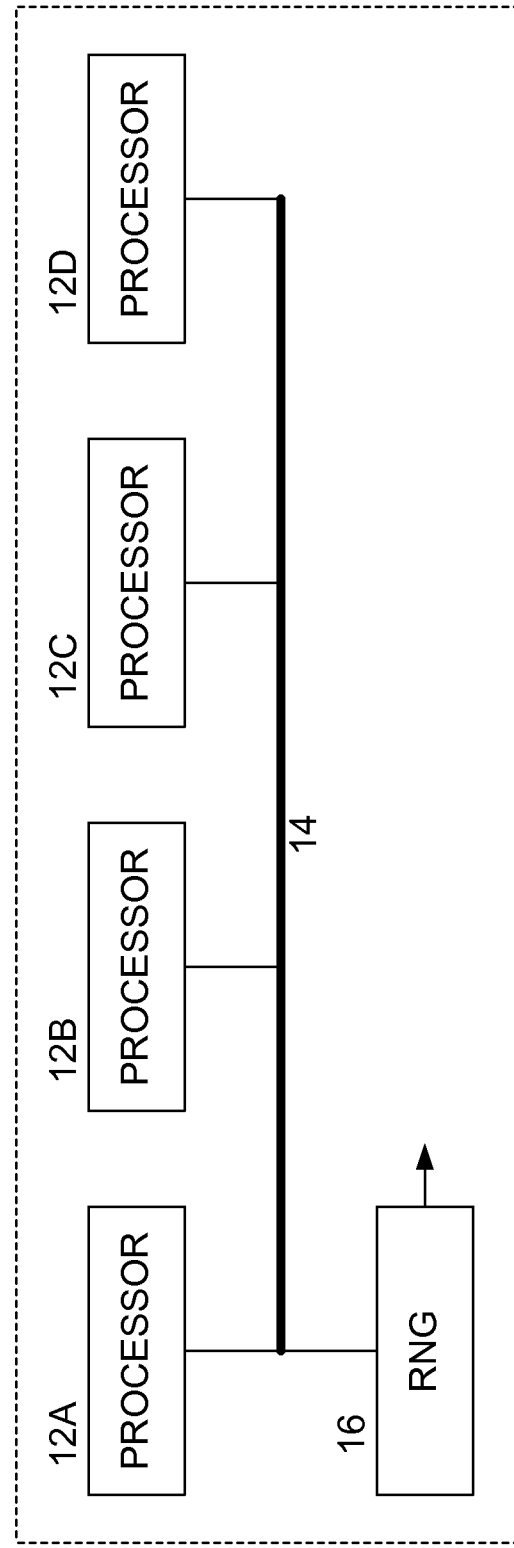
FIG. 1 is a block diagram illustrating a conventional multiprocessing system.
Figure 2:
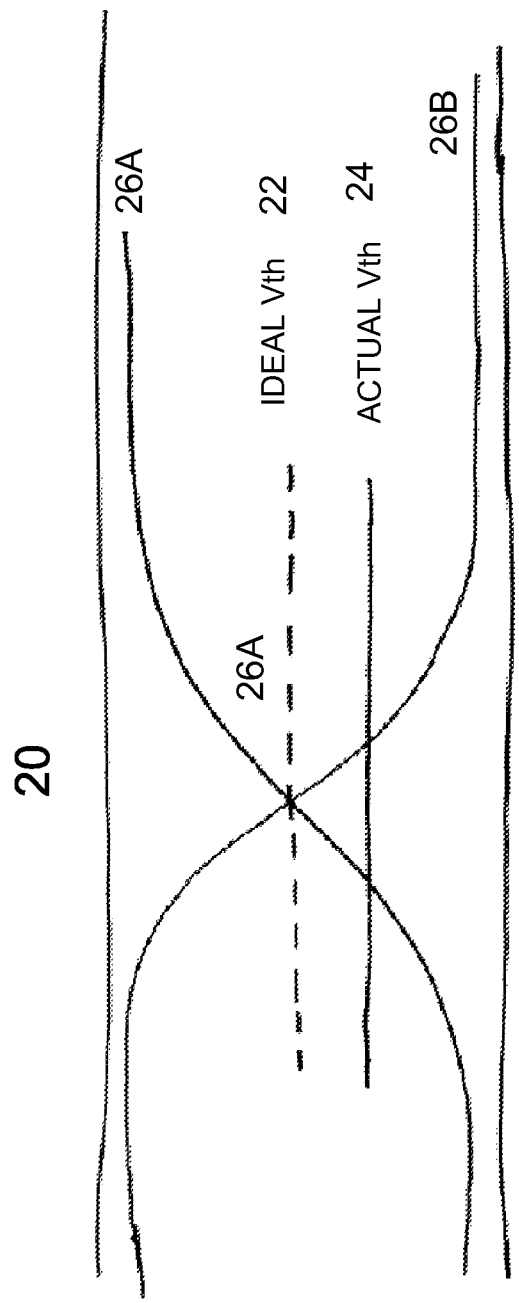
FIG. 2 is a graph illustrating non-ideal behavior of a ring oscillator.
Figure 3:
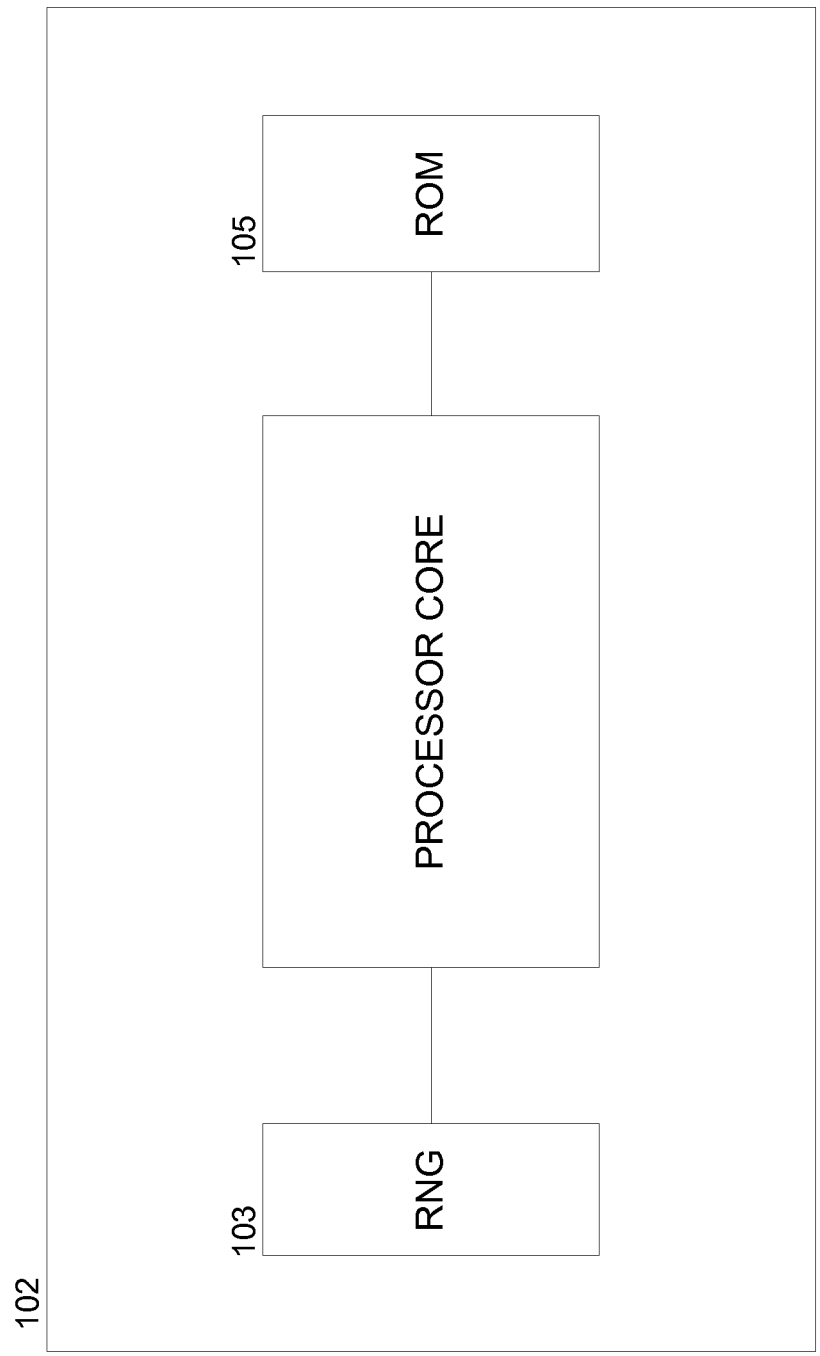
FIG. 3 is a block diagram illustrating a processor in accordance with one or more embodiments of the present invention.

FIG. 3 is a block diagram illustrating a processor 102 in accordance with one or more embodiments of the present invention. Processor 102 preferably includes a processor core, at least one random number generator (RNG) 103, and read-only memory (ROM) 105.

Processor 102 may be implemented utilizing any of the known technologies that are capable of requesting data from a system memory (not shown), and manipulating the data to achieve a desirable result. For example, processor 102 may be implemented using any of the known microprocessors that are capable of executing software and/or firmware, including standard microprocessors, distributed microprocessors, etc. By way of example, processor 102 may be a graphics processor that is capable of requesting and manipulating data, such as pixel data, including gray scale information, color information, texture data, polygonal information, video frame information, etc.

Processor 102 preferably includes at least one random number generator (RNG) 103 disposed therein. For the purpose of discussion, it is assumed that a "processor" includes the processor core and/or any other components that are within the boundary of the processor core on the chip to achieve processing results. In this embodiment of the invention, the RNG 103 is accessible to the processor core of processor 102.

The RNG 103 is preferably operable to produce random numbers in the form of a plurality of bits that may take on a logic high and/or a logic low. Each RNG 103 may be implemented using one or more ring oscillators, where the outputs of the individual ring oscillators are aggregated to form a random bit string.

Processor 102 may also include a storage medium, such as secure ROM 105 that is operatively coupled to the processor core of processor 102. In one or more embodiments, storage medium 105 is preferably a secure device, such as a permanently programmable ROM that contains encrypted code and/or other data useful for further randomizing random numbers output from RNG 103. The stored, encrypted code may include hash algorithms and/or other randomization software.

The security of the storage medium (ROM) 110 is preferably such that the encrypted program code and/or other information stored therein may not be accessed by unauthorized entities. For example, the encrypted program code may be established during the manufacture of the apparatus 100, at which time the program code may be encrypted utilizing a private encryption key.

In accordance with one or more embodiments of the present invention, processor 102 is preferably operable to enter into secure modes of operation utilizing one or more random numbers generated by RNG 103. For example, processor 102 may utilize one or more random numbers generated by its associated RNG 103 to encrypt sensitive data for later use and/or storage somewhere within a multiprocessing system (not shown) or in some external device (not shown). Alternatively or additionally, two or more processors of a same or similar type as processor 102 may establish a virtual private network (VPN) therebetween using one or more random numbers generated by RNG 103. Still further, one or more of processors 102 may utilize a random number to establish secure communication with a device external to a multiprocessing system that the one or more processors 102 are included within, where this external device may be another processing system. These and other aspects and embodiments of the invention will be discussed in more detail later in this document.

Figure 4:
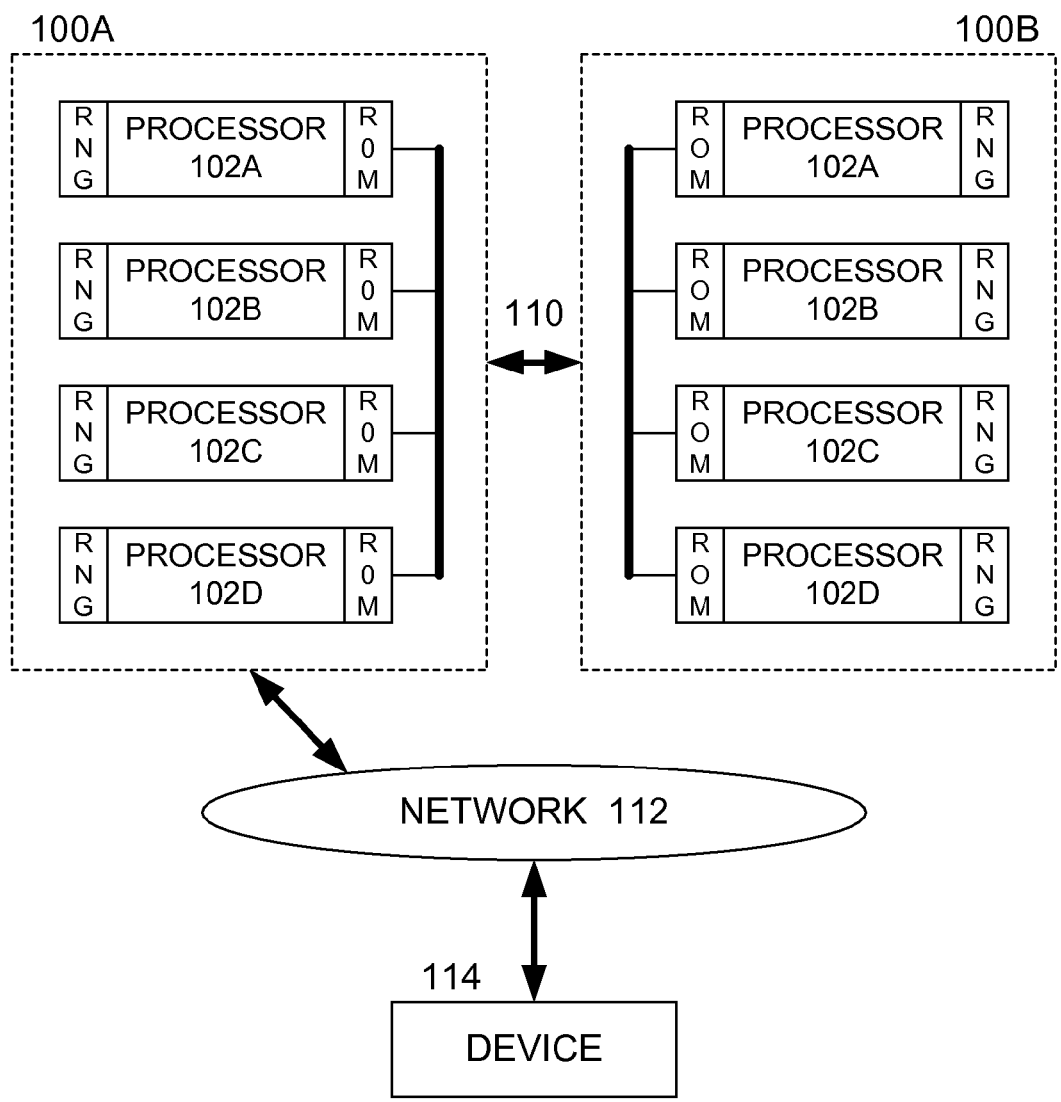
FIG. 4 is a block diagram of a system in which multiprocessing systems, including processors such as the one shown in FIG. 3, or other embodiments herein, are capable of establishing secure communication modes with one or more external devices.

FIG. 4 is a block diagram of a computing system in which multiprocessor systems 100A and 100B, including processors such as the one shown in FIG. 3 or other embodiments herein, are capable of establishing secure communication modes with one or more external devices 114.

Computing system 120 may include multiprocessor systems 100A and 100B, communication links 110 disposed therebetween, external device 114, and network 112 coupling one or more of the multiprocessor systems 100 to external device 114.

Each multiprocessor system 100 may include four processors 102A-D, although any number of processors may be employed without departing from the spirit and scope of the one or more embodiments of the invention. Each processor 102 may be of the same or similar construction as processor 102 of FIG. 3. However, other processor constructions may be employed. Each processor 102 preferably includes a respective RNG 103 and a respective ROM 105, as discussed in connection with processor 102 of FIG. 3.

In one or more embodiments, network 112 may be any communication network suitable for enabling a plurality of network participants, such as multiprocessors systems 100A and 100B, and device 114, to transfer data amongst one another. Network 112 may be a packet switched network, circuit switched network or other suitably configured data communication network.

In one or more embodiments, external device 114 may be any digital device capable of conducting digital communication over a network, such as network 112. External device 114 may be a processor, such as processor 102, a multiprocessor system, such as multiprocessor system 100A, or a computing system, such as computing system 120, or a combination of one or more of the foregoing. However, external device 114 is not limited to being any of the foregoing.

In one or more embodiments, communication links 110 may include any wired or wireless mechanism for enabling communication between multiprocessor systems 100A and 100B. Communication links 110 may be established during the manufacture of computing system 120 or may be used to connect multiprocessor systems 100A and 100B after the manufacture thereof.

In FIG. 4, for the sake of convenience, reference numerals for RNGs 103 and for ROMs 105 are omitted. For the sake of convenience and consistency with the illustration of processor 102 of FIG. 3, the ROMs 105 are shown at the right of the processors 102 within multiprocessor system 100A, and by virtue of symmetry, at the left of processors 102 within multiprocessor system 100B. The illustrated locations of ROMs 105 within the processors 102 of FIG. 3 are for the sake of convenience. Although preferred, the respective RNGs 103 and ROMs 105 are not limited to being physically located with respect to the processor cores in the manner illustrated in FIG. 3 or any other figure herein.

One or more of the processors 102 of the first multiprocessing system 100A may establish a virtual private network (VPN) with one or more of the processors of the second multiprocessing system 100B. Those skilled in the art will appreciate that establishing the VPN between processors of the respective systems 100A, 100B may utilize the techniques discussed elsewhere herein or other known techniques so long as at least one random number is generated utilizing one or more of the dedicated RNGs 103.

Alternatively or additionally to the functionality discussed thus far, one or more of the multiprocessing systems 100, such as system 100A, may establish secure modes of operation (such as VPNs) with respect to external device 114 over one or more further communication links, such as network 112 (which may be a packet-switched network or other type of network known in the art). Moreover, an individual processor 102, located within one of the multiprocessor systems 100, may establish a secure mode of operation, such as but not limited to a VPN, with a device (such as device 114) external to its multiprocessor system 100.

Further embodiments of the present invention contemplate that more than one secure communications link may be established as between the multiprocessing system 100 and one or more external devices. Similarly, it is contemplated that one or more secure communications links (including one or more VPNs) may be established between respective pairs or groups of processors 102 within a given multiprocessing system 100. Advantageously, this permits the multiprocessing system 100 to host numerous entities, where such entities need not trust one another with sensitive data. Indeed, the ability to establish secure communication links and/or secure encryption routes by way of the dedicated RNGs 103 may enable the individual processors 102 to thwart hacking by un-trusted entities during the establishment and/or use of such secure modes.

Figure 5:
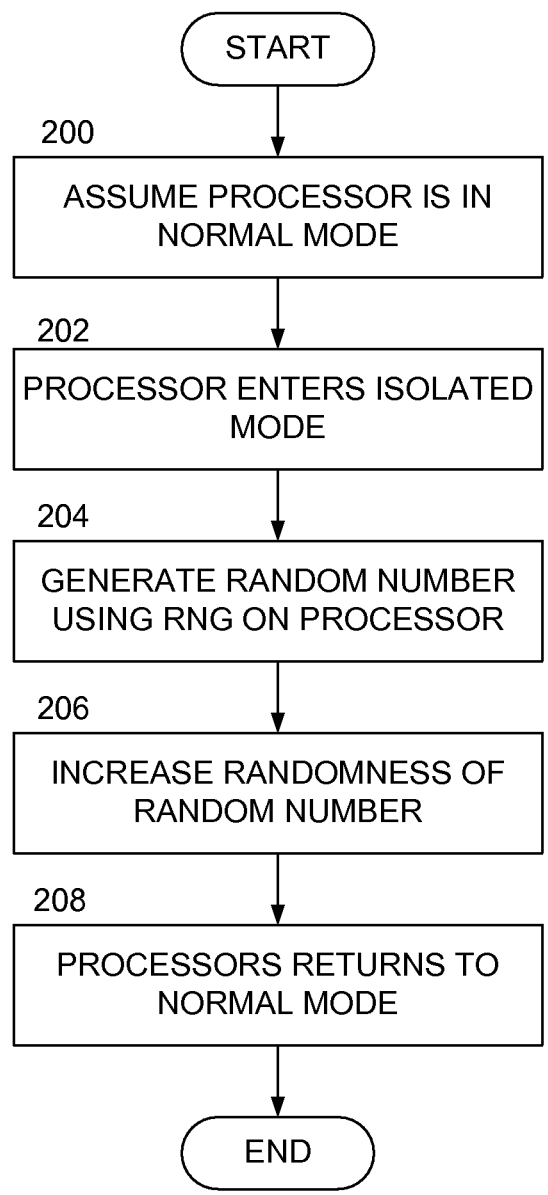
FIG. 5 is a flow diagram illustrating a method that may be carried out by the processor of FIG. 3 and/or by other processor embodiments discussed herein.

FIG. 5 is a flow diagram illustrating a method that may be carried out by the processor of FIG. 3 and/or by other processor embodiments discussed herein. The method of FIG. 5 is generally directed to securely generating a random number within a single processor. In one or more embodiments, the method of FIG. 5 may be carried out using one or more processors such as the one shown in FIG. 3 and described in connection therewith. However, other processors described herein may be employed.

Figure 7:
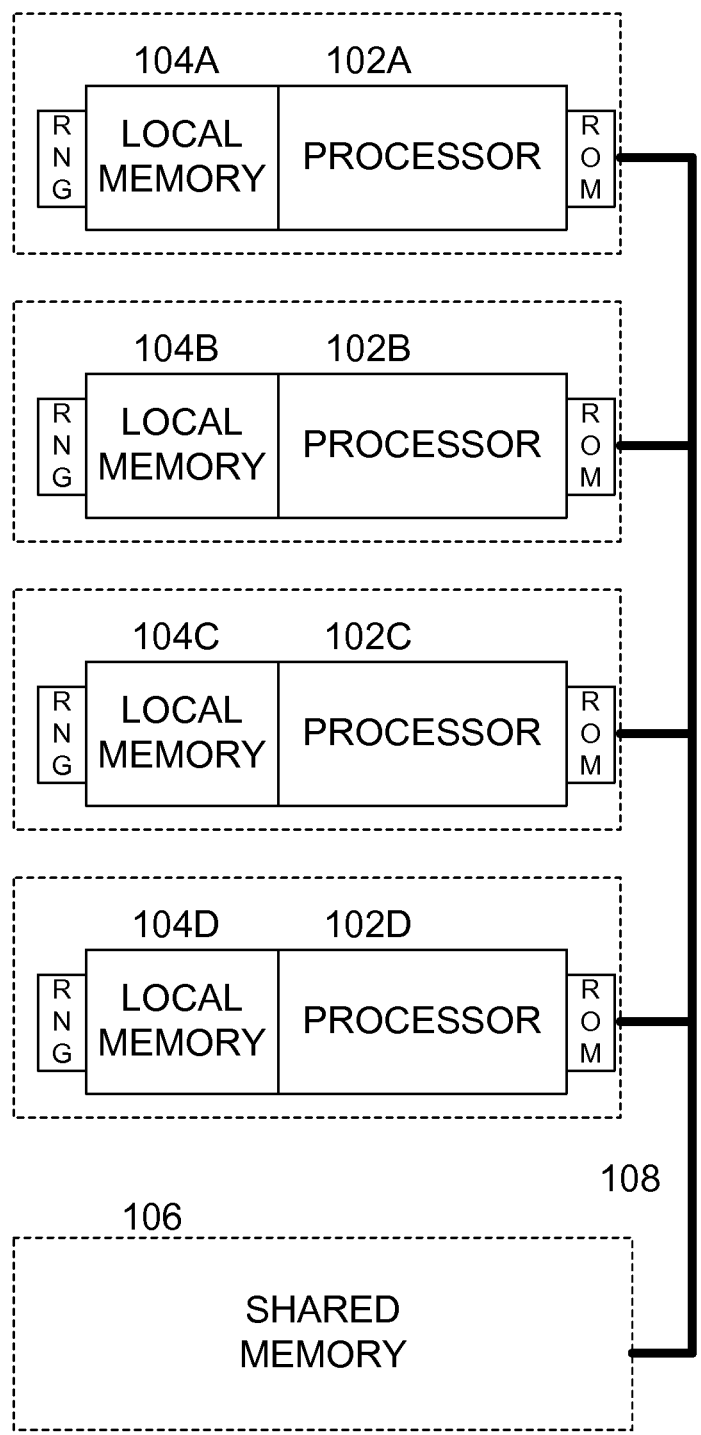
FIG. 7 is a diagram illustrating a multiprocessing system that may be adapted to use a plurality of RNGs in accordance with one or more further embodiments of the present invention.

Prior to describing the actions of the method of FIG. 5, a description of various operational modes of processor 102 is provided. Processor 102 may operate in any several operational modes, which modes are described in the following. These modes preferably include a first mode (normal mode), whereby the processor 102 and any external device or devices may initiate a transfer of information into or out of the processor 102, e.g., into or out of the local memory 104 (FIG. 7). The operational modes also preferably include a second mode (isolated mode), whereby neither the processor 102 nor any external device or devices may initiate a transfer of information into or out of the processor 102. The operational modes also preferably include a third mode (secure mode), whereby the processor 102 may initiate a transfer of information into or out of the processor 102, but no external device or devices may initiate a transfer of information into or out of the processor 102. Herein, the term "protected mode" may include the isolated mode and/or the secure mode.

With reference to FIG. 5, at action 200, it is assumed that processor 102 is in normal mode. At action 202, processor 102 preferably enters the isolated mode. Preferably, entering the isolated mode in action 202 may operate to protect the security of any random number(s) generated in subsequent actions and by extension protect the integrity of secure modes, such as virtual private networks, established using such random numbers.

At action 204, a random number is preferably generated using RNG 103 on processor 102. In one or more embodiments, a plurality of RNGs 103 may be employed to generate a plurality of respective bit sequences to form a random number. Alternatively, a single RNG 103 may be run a plurality of times to generate a plurality of bits.

At action 206, the random number generated in action 204 may be further randomized employing suitably configured software. There exist any number of commercially available software packages suitable for the purpose of further randomizing the random number generated in action 204, which are known to skilled artisans. One type of program suited to such further randomization is a hash algorithm, which may also be used to change the bit length of the random number. However, other randomization algorithms may be employed to increase the randomness of the number emerging from the RNG 103, and all such variations are intended to be included within the scope of the present invention.

The randomization software is preferably stored in ROM 105 in encrypted form. The encryption of the randomization software is preferably performed employing a private key, which private key may also be stored in ROM 105. To ensure the trustworthiness of the randomization software, ROM 105 is preferably accessible by processor 102 only when processor 102 is in a protected mode (either a secure mode or an isolated mode). In this manner, unauthorized access to the randomization software is preferably prevented. Moreover, undesired and unauthorized modifications of the randomization software are preferably also prevented.

Once processor 102 is in a protected mode, processor 102 preferably reads the encrypted randomization software from ROM 105 into the processors' local memory. Processor 102 may then also read the private key from ROM 105 into the processor's local memory. Processor 102 may then decrypt the encrypted randomization software using the private key. In an alternative embodiment, specially configured hardware, such as a decryption unit, may decrypt the randomization software and provide the decrypted software to processor 102.

In addition to decrypting the software, The decryption process itself may also authenticate the randomization software, or additional steps may be taken to achieve such authentication. For example, the processor 102 and/or other specially configured hardware may be operable to verify the authenticity of the randomization software by executing a hash algorithm to produce a hash result and to compare the hash result with a predetermined hash result. Assuming that the predetermined hash result is trusted, such a comparison may ensure that a match between the two hash results is indicative of the authenticity of the randomization software. In one or more embodiments, the predetermined hash result may be stored in encrypted form within ROM 105 or other secure medium. Once the randomization software is authenticated, processor 102 preferably runs the randomization software on the previously generated random number to further randomize same.

Once the random number has been further randomized in action 206, processor 102 may return to the normal mode. However, in one or more alternative embodiments, processor 102 may remain in the isolated mode or transition to the secure mode.

Figure 6:
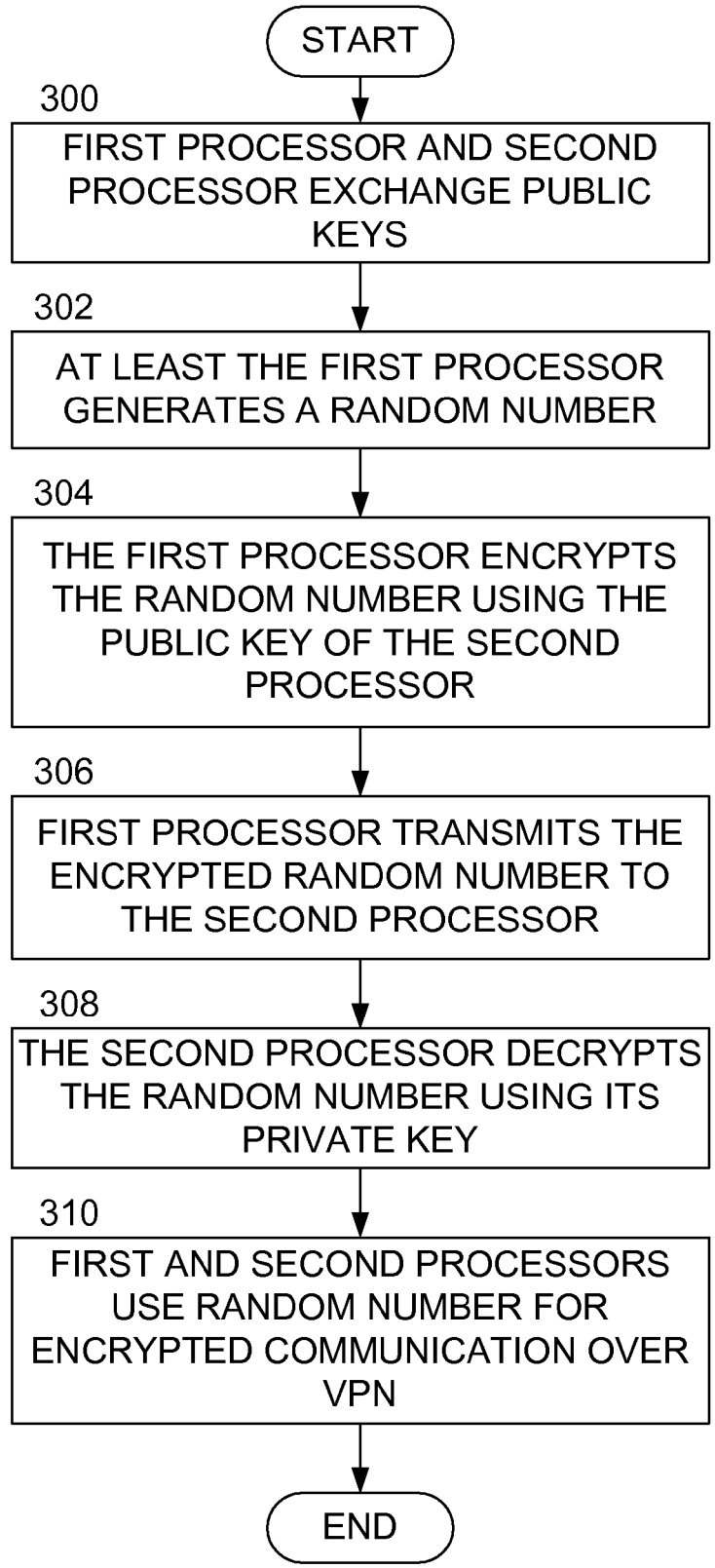
FIG. 6 is a flow diagram illustrating a method that may be carried out by two or more processors such as the one shown in FIG. 4 or other embodiments herein.

The method of FIG. 6 is directed to one possible use for a random number generated in the manner shown in FIG. 4. However, the present invention is not limited by any particular use of such a random number.

Upon having securely generated a random number using the method of FIG. 5, it may be desirable to establish a secure mode of communication, such as a virtual private network (VPN), between two or more devices. The two (or more) devices forming the VPN may both be processors 102 located within a single device, such as multiprocessor system 100A. Alternatively, the two processors 102 may be located on different ones of multiprocessors systems 100A and 100B (FIG. 4). In other alternative embodiments, one or more of the devices forming part of the virtual private network, may be multiprocessor systems 100, and all such variations are intended to be included within the scope of the present invention.

With reference to FIG. 6, the processors 102 are preferably operable to enter into secure modes of operation with one another using one or more random numbers produced by one or more of the RNGs 103. For example, two of the processors 102 may establish a virtual private network therebetween. This may be carried out by a first processor 102A and a second processor 102B in accordance with the following procedure.

The first processor 102A and the second processor 102B may exchange public keys by transmitting same over bus 108 (FIG. 7) (action 300). Next, the first processor 102A may utilize its associated RNG 103A to produce at least one random number and, optionally, may increase the randomness of this random number using randomization software stored in encrypted form on a ROM 105 (action 302). This method of generating, and increasing the randomness of, a random number is described in greater detail in connection with the method of FIG. 4.

The first processor 102A may encrypt the random number using the public key of the second processor 102B (action 304). Thereafter, the first processor 102A may transmit the encrypted random number to the second processor 102B over the bus 108 (action 306). At action 308, the second processor 102B may decrypt the random number utilizing its private key, where the private key is paired with the public key thereof.

At this point, both the first and second processors 102A, 102B are preferably privy to the same random number, which random number is not accessible by the other processors or external devices unless such access is permitted. At action 310, the first and second processors 102A, 102B may utilize the random number to encrypt further communication therebetween, thereby establishing a virtual private network.

It is noted that the multiprocessing systems 100 as described hereinabove may be operable to implement secure modes of operation, such as the establishment of one or more VPNs between selected processors 102, while permitting one or more other processors (not party to the VPNs) to execute programs of un-trusted entities. Indeed, the provision of one or more dedicated RNGs 103 for one or more of the processors 102 thwarts the ability of a hacker to intercept a random number when it is generated or when it is utilized to establish secure modes of operation.

FIG. 7 is a block diagram of a multiprocessing system 100A that may be adapted to implement the features discussed herein and one or more further embodiments of the present invention. The system 100A includes a plurality of processors 102A-D, associated local memories 104A-D, and a shared memory 106 interconnected by way of a bus 108. Each processor 102 may also include RNG 103 and ROM 105 (reference numerals 103 and 105 omitted in FIG. 7). For the sake of simplicity, an illustration of ROM 105 is not provided in FIG. 7. However, in one or more embodiments of multi-processor 100A, a respective ROM 105 may be included in each processor 102 and configured as described in connection with the embodiment of processor 102 shown in FIG. 3.

The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multiprocessing computer system are constructed from a common computing module (or cell). This common computing module has a consistent structure and preferably employs the same instruction set architecture. The multiprocessing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multiprocessing computer system, and if a network is employed, the rapid transmission of applications and data over the network. This structure also simplifies the building of members of the network of various sizes and processing power and the preparation of applications for processing by these members.

Figure 8:
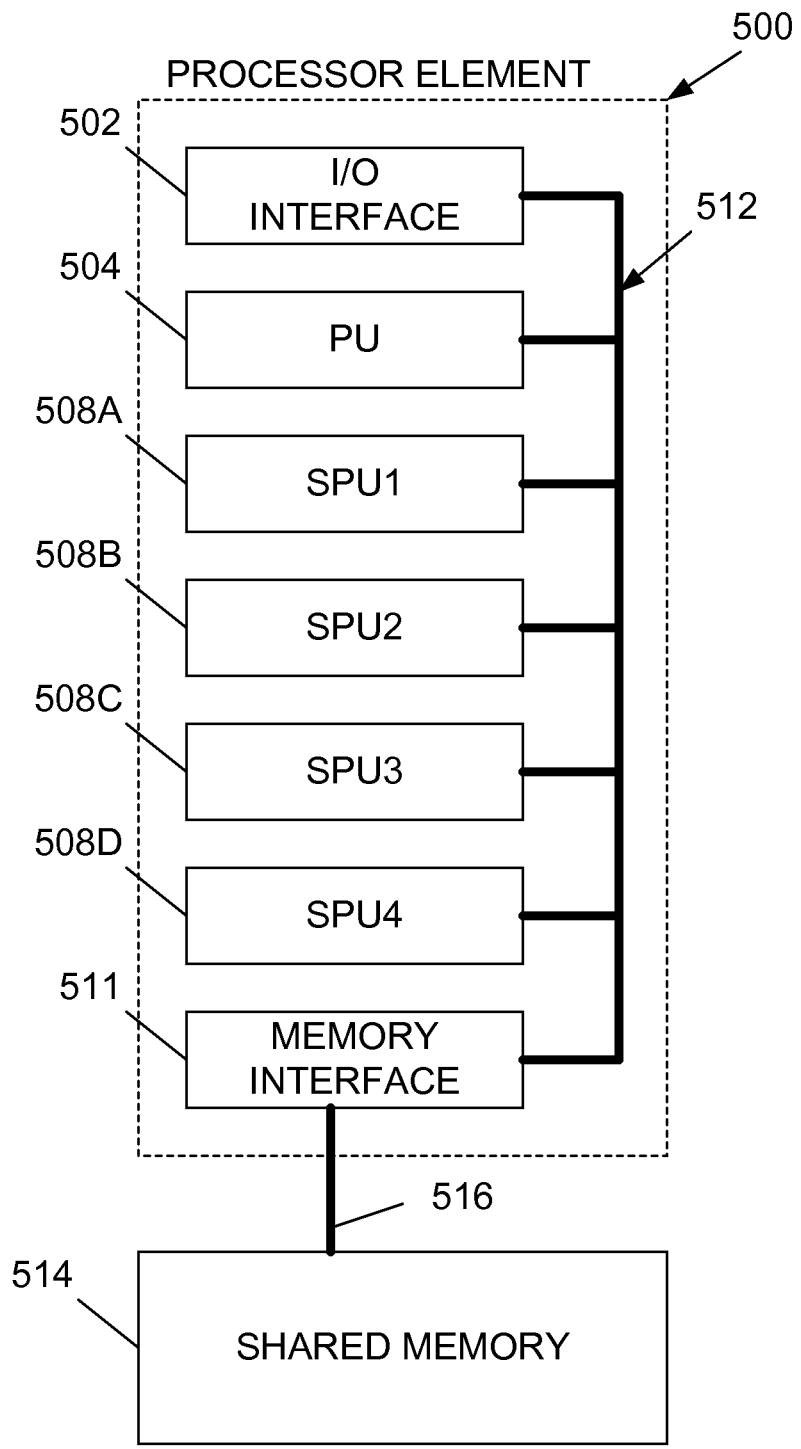
FIG. 8 is a diagram illustrating a preferred processor element (PE) that may be used to implement one or more further aspects of the present invention.

With reference to FIG. 8, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 9:
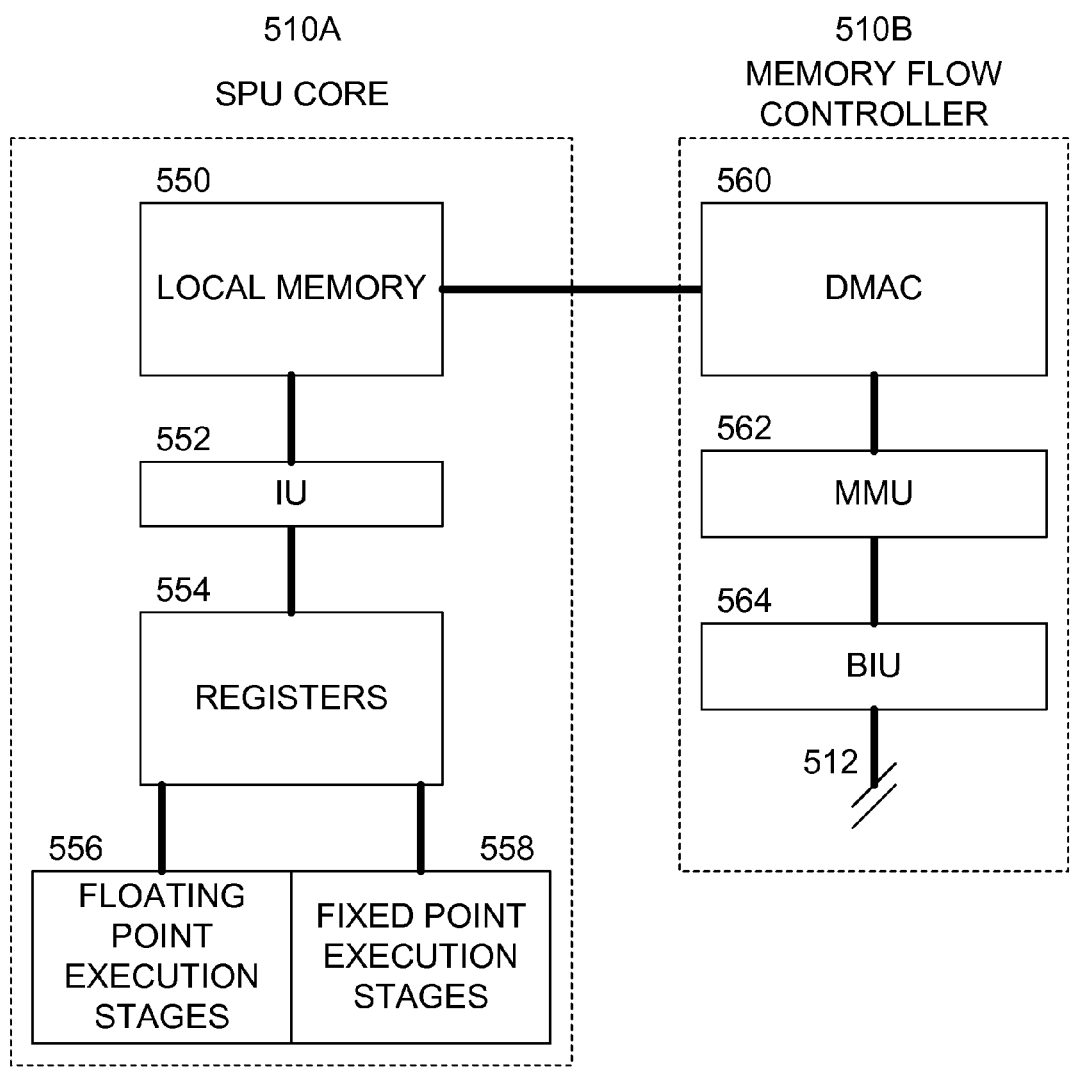
FIG. 9 is a diagram illustrating the structure of an exemplary sub-processing unit (SPU) of the system of FIG. 7 that may be adapted in accordance with one or more further aspects of the present invention.

FIG. 9 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 10:
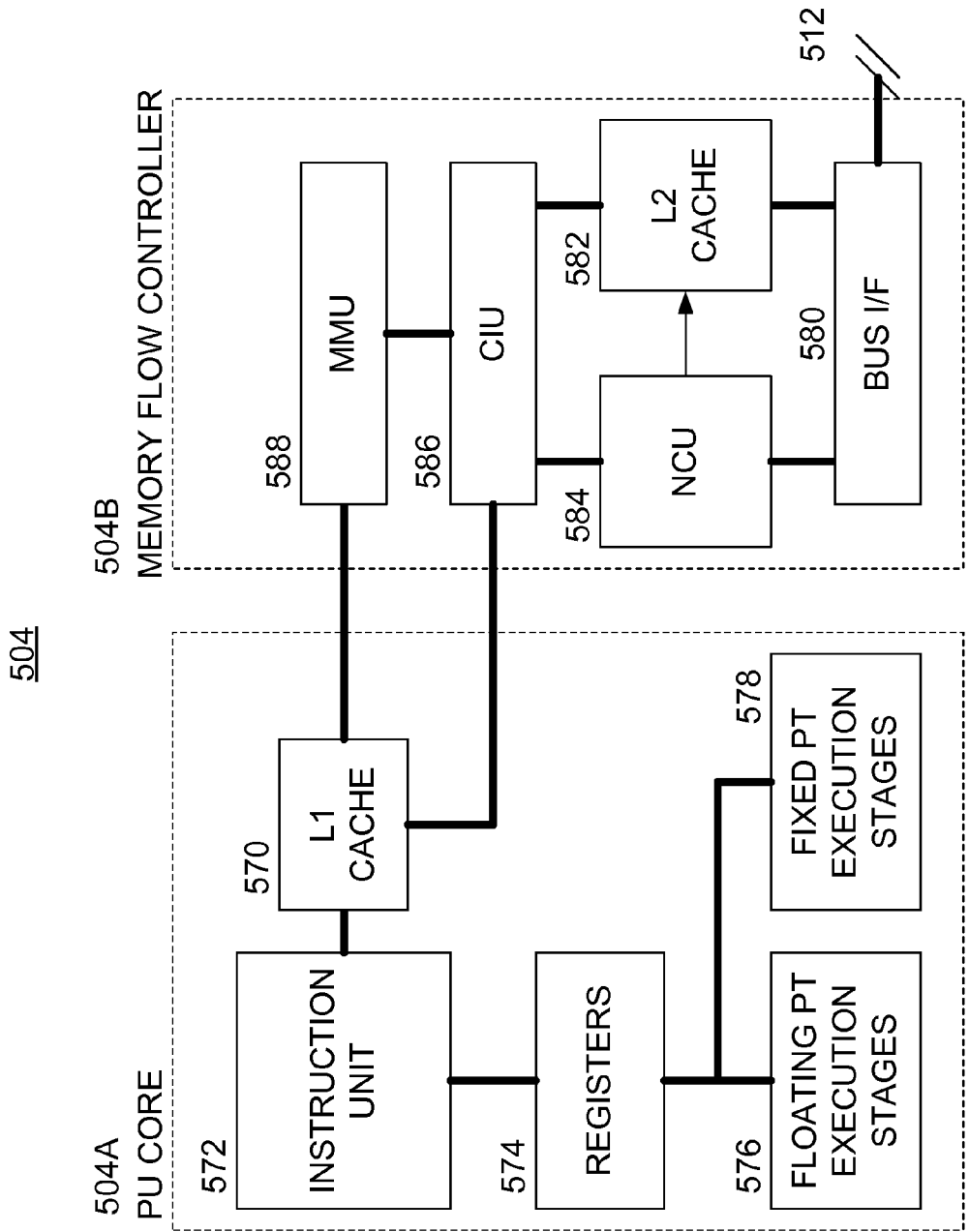
FIG. 10 is a diagram illustrating the structure of an exemplary processing unit (PU) of the system of FIG. 7 that may be adapted in accordance with one or more further aspects of the present invention.

FIG. 10 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
providing at least one processor with an integrally disposed random number generator (RNG) therein;
entering a protected mode by said at least one processor, wherein said protected mode is an isolated mode in which neither said at least one processor nor any device external to said at least one processor may initiate a transfer of information: (i) into said at least one processor, (ii) out of said at least one processor, and (iii) both into and out of said at least one processor, wherein the isolated mode operates to protect the security of any random numbers generated in subsequent actions and to protect the integrity of secure modes within the at least one processor; and
generating a random number using said RNG in said at least one processor after entering said protected mode.

2. The method of claim 1 further comprising:
storing a program to increase a randomness in generation of said random number, the program is stored in encrypted form in a read only memory (ROM) within said at least one processor;
executing said program on said at least one processor.

3. The method of claim 2 wherein said program stored in said ROM is inaccessible by unauthorized entities.

4. The method of claim 2 further comprising:
loading said program after said entering said protected mode;
decrypting said program; and
running said program.

5. The method of claim 4 wherein said decrypting comprises: decrypting said program employing a private key stored in a ROM within said at least one processor.

6. The method of claim 1 further comprising:
verifying the authenticity of said program by executing a hash algorithm to produce a hash result; and
comparing said hash result to a predetermined hash value.

7. The method of claim 6 wherein said predetermined hash value is stored in a ROM within said at least one processor.

8. The method of claim 1 further comprising:
implementing a virtual private network (VPN) between said at least one processor and at least one other device, said implementing using said random number.

9. The method of claim 8 wherein said at least one other device is a processor located in a same multiprocessor system as said at least one processor.

10. The method of claim 8 wherein said at least one other device is external to a multiprocessor system in which said at least one processor is located.

11. The method of claim 1 wherein said RNG comprises a ring oscillator.

12. An apparatus, comprising
at least one processor with an integrally disposed random number generator (RNG) therein, wherein said at least one processor is operable to:
enter a protected mode by said at least one processor, wherein said protected mode is an isolated mode in which neither said at least one processor nor any device external to said at least one processor may initiate a transfer of information: (i) into said at least one processor, (ii) out of said at least one processor, and (iii) both into and out of said at least one processor, wherein the isolated mode operates to protect the security of any random numbers generated in subsequent actions and to protect the integrity of secure modes within the at least one processor; and
generate a random number using said RNG in said at least one processor after entering said protected mode.

13. The apparatus of claim 12 wherein said apparatus is further operable to:
store a program to increase a randomness in the generation of said random number in encrypted form in a read only memory (ROM) within said at least one processor;
execute the program on said at least one processor.

14. The apparatus of claim 13 wherein said program stored in said ROM is inaccessible by unauthorized entities.

15. The apparatus of claim 13 wherein said apparatus is further operable to:
load said program after said entering said protected mode;
decrypt said program; and
run said program.

16. The apparatus of claim 15 wherein said decrypting comprises:
decrypting said program employing a private key stored in a ROM within said at least one processor.

17. The apparatus of claim 15 wherein said apparatus is further operable to:
verify the authenticity of said program by executing a hash algorithm to produce a hash result; and
compare said hash result to a predetermined hash value.

18. The apparatus of claim 17 wherein said predetermined hash value is stored in a ROM within said at least one processor.

19. The apparatus of claim 12 wherein said apparatus is operable to:
implement a virtual private network (VPN) between said at least one processor and at least one other device, said implementing using said random number.

20. The apparatus of claim 19 wherein said at least one other device is a processor located in a same multiprocessor system as said at least one processor.

21. The apparatus of claim 19 wherein said at least one other device is external to a multiprocessor system in which said at least one processor is located.

22. The apparatus of claim 12 wherein said RNG comprises a ring oscillator.

* * * * *